United States Patent [19]

Kuhn et al.

[11] 4,002,865
[45] Jan. 11, 1977

[54] DRAWOUT TYPE CIRCUIT INTERRUPTER WITH INTERLOCKED LEVERING MECHANISM

[75] Inventors: Edmund W. Kuhn; Alan G. McGuffie, both of Pittsburgh, Pa.

[73] Assignee: Westinghouse Electric Corporation, Pittsburgh, Pa.

[22] Filed: Apr. 2, 1975

[21] Appl. No.: 564,577

[52] U.S. Cl. .......................................... 200/50 AA
[51] Int. Cl.² ......................................... H01H 9/22
[58] Field of Search ............ 200/50 AA, 50 A, 330; 317/103

[56] References Cited

UNITED STATES PATENTS

| | | | |
|---|---|---|---|
| 2,273,002 | 2/1942 | Mahoney | 317/103 |
| 2,617,862 | 11/1952 | Caswell | 200/50 AA |
| 2,777,024 | 1/1957 | West | 200/50 AA |
| 2,921,998 | 1/1960 | Pokorney et al. | 200/50 AA |
| 3,219,771 | 11/1965 | Umphrey | 200/50 AA |
| 3,578,925 | 5/1971 | Drown et al. | 200/50 AA |
| 3,783,209 | 1/1974 | Cleaveland et al. | 200/50 AA |

*Primary Examiner*—James R. Scott
*Attorney, Agent, or Firm*—R. E. Converse

[57] ABSTRACT

An enclosed circuit interrupter includes a removable drawout unit mounted within an enclosure and sealed by an enclosure door. The drawout unit is movable between a connected position and a disconnected position by a levering mechanism operated by a levering crank. A shutter prevents insertion of the levering crank unless the circuit interrupter is tripped by actuation of a trip plate. An interlock prevents removal of the inserted levering crank when the drawout unit is at any position intermediate the completely connected and completely disconnected positions. Closing of the enclosure door is prevented when the levering crank is inserted.

8 Claims, 9 Drawing Figures

DRAWOUT TYPE CIRCUIT INTERRUPTER WITH INTERLOCKED LEVERING MECHANISM

CROSS-REFERENCE TO RELATED APPLICATIONS

This invention is related to U.S. patent application Ser. No. 564,574, entitled "Enclosed Circuit Interrupter With Door Mounted Control Handle Mechanism", filed Apr. 2, 1975, by W. Paul Matty and Alan G. McGuffie; U.S. patent application Ser. No. 564,573, entitled "Draw-Out Type Circuit Interrupter With Modular Construction", filed Apr. 2, 1975, by Edmund W. Kuhn, J. L. Uber, and Joseph D. Findley; U.S. patent application Ser. No. 564,575, entitled "Enclosed Circuit Interrupter With Interlocked Safety Barrier", filed Apr. 2, 1975, by Edmund W. Kuhn, Alan G. McGuffie, and W. Paul Matty; U.S. patent application Ser. No. 564,576, entitled "Enclosed Circuit Interrupter With Improved Fuse Assembly", filed Apr. 2, 1975, by Edmund W. Kuhn and J. L. Uber; and U.S. Pat. No. 3,923,197, entitled "Gasket Assembly For Enclosed Electrical Apparatus" issued to Edmund W. Kuhn. Each of the above-mentioned applications is assigned to the assignee of the present invention.

BACKGROUND OF THE INVENTION

1. Field of the Invention

The invention relates generally to electrical apparatus and more particularly to drawout type circuit interrupters.

2. Description of the Prior Art

Drawout type circuit interrupters, widely used in industrial and electric utility applications, consist of a circuit interrupter including a set of separable contacts removably mounted within an enclosure in a manner similar to a drawer in a file cabinet. When the drawout unit is completely inserted into the enclosure, the separable contacts bridge pairs of terminals connected to electrical loads and sources of electrical energy. Thus when the drawout unit is completely inserted, the separable contacts serve to control the flow of current through the terminals.

For safety reasons, the drawout type circuit interrupter usually includes a mechanism for indirectly moving the drawout unit between a connected fully engaged position and a disconnected disengaged position. However, it is often difficult to tell when the drawout unit is at the extreme of its travel, that is either fully connected or fully disconnected. If not fully connected, arcing or overheating can occur at the point of connection between the separable contacts and the terminals when the separable contacts are closed. In addition, if maintenance is attempted on the drawout unit before it is completely disconnected from the source of electrical energy, severe injury to maintenance personnel can occur. Thus it would be desirable to provide a drawout type circuit interrupter which includes means to positively indicate when the drawout unit is in either the connected or disconnected position. In addition it is desirable to provide an interlock to prevent inadvertent incomplete operation of the drawout unit to either the connected or disconnected position.

SUMMARY OF THE INVENTION

In accordance with the principles of the present invention, there is provided a drawout type circuit interrupter including an enclosure, a circuit interrupter unit mounted within the enclosure and movable between connected and disconnected positions; drawout means for moving the circuit interrupter unit between connected and disconnected positions; removable means for operating the drawout means; and interlock means permitting insertion or removal of the operating means when the circuit interrupter unit is either in a connected or disconnected position. The interlock means traps the operating means and prevents removal of the operating means when the circuit interrupter unit is in any position intermediate a connected and disconnected position.

By trapping the inserted operating means in the drawout means, positive drawout unit position can be determined. In addition, the door of the enclosure cannot be closed until the operating means is removed, preventing damage to the drawout unit. The circuit interrupter unit is held in a trip-free condition when the operating means is trapped. Thus, operation of the circuit interrupter with the door closed is prevented while the drawout unit is in an intermediate position thereby preventing arcing or overheating produced by incomplete connection as well as the possibility of injuries to maintenance personnels due to incomplete disconnection.

DESCRIPTION OF THE PREFERRED EMBODIMENT

Figure 1:
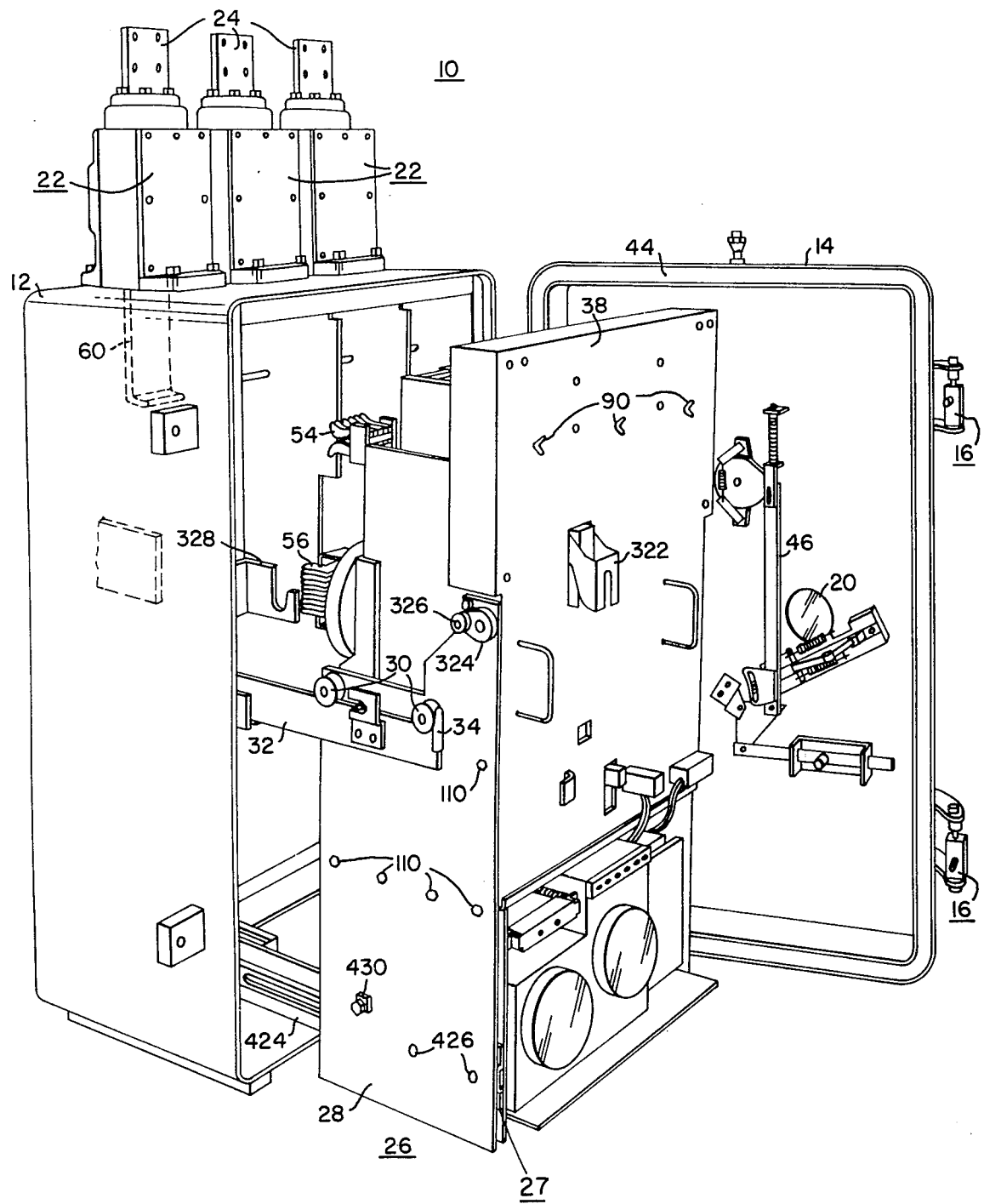
FIG. 1 is a perspective view of a network protector constructed in accordance with the principles of the present invention, with the drawout unit shown rolled out on rails from the protector enclosure.

Throughout the drawings corresponding reference characters refer to corresponding parts.

Referring now to the drawings, in FIG. 1 there is shown a network protector 10 constructed in accordance with the principles of the present invention. A steel enclosure 12 is provided with a door 14 secured to the enclosure 12 by four hinged fasteners 16, only 2 of which are shown in FIG. 1. A control handle (not shown) extends through the door and is connected to a mechanism 46 to manually operate the network protector. The control mechanism 46 is more completely described in the aforementioned copending U.S. patent application Ser. No. 564,574, entitled "Enclosed Circuit Interrupter With Door Mounted Control Handle Mechanism". The door 14 is provided with a viewing window 20 through which to observe a flag 272 (FIG. 2) to indicate the position of the network protector contacts. Mounted on top of the enclosure 12 are three fuse assemblies 22, each of which includes a terminal 24 adapted for connection to the low voltage secondary network cables. The fuse assemblies 22 are more completely described in the aforementioned copending U.S. patent application Ser. No. 564,576, entitled "Enclosed Circuit Interrupter With Improved Fuse Assembly".

Figure 2:
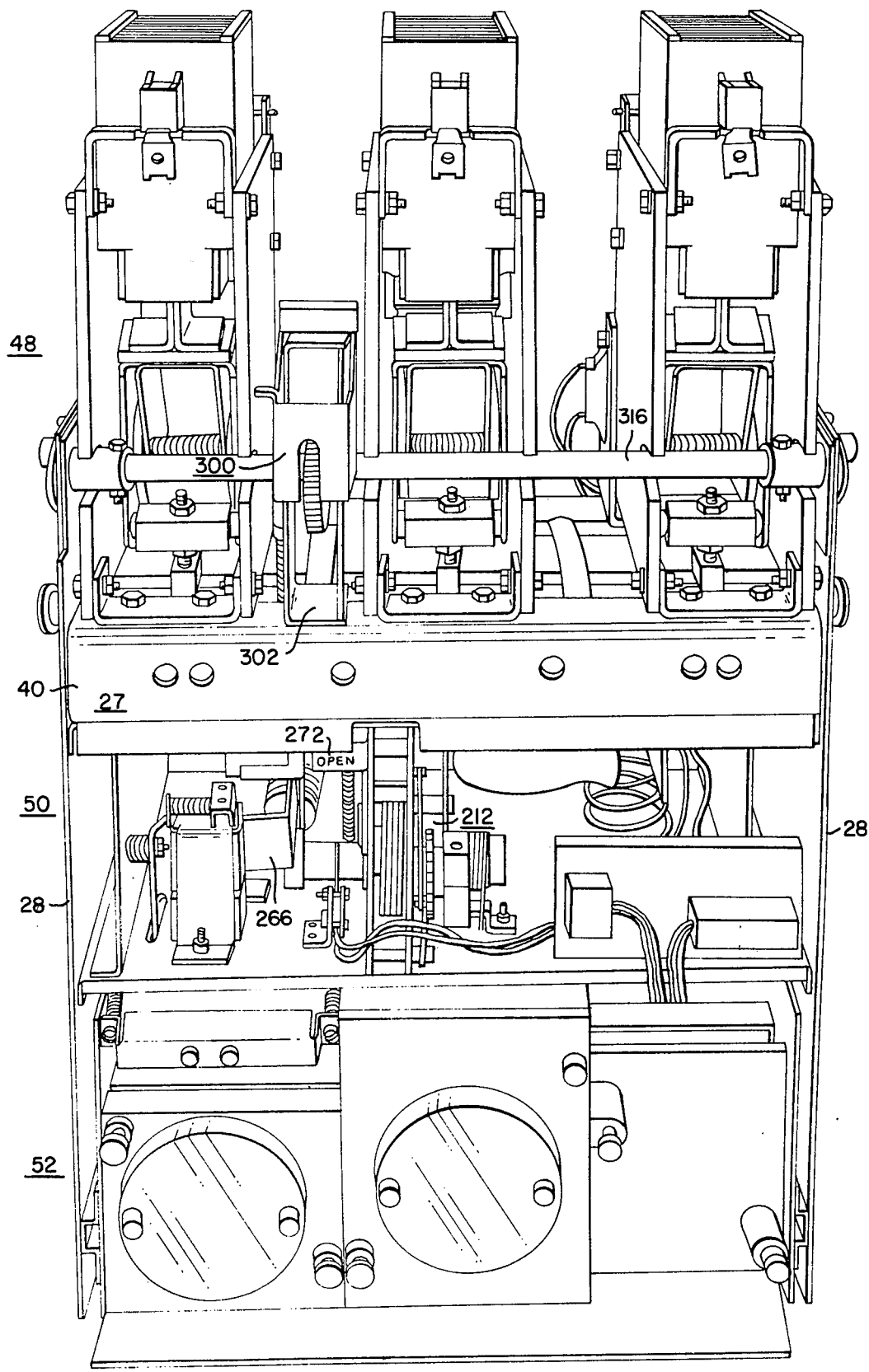
FIG. 2 is a front perspective view of the drawout unit shown in FIG. 1, with the protective barrier removed.

The network protector 10 includes a drawout unit 26 supported by a main support frame 27 (FIG. 2). The main support frame 27 includes two side support plates 28 connected by two welded steel channel members 40, one of which is shown more clearly in FIGS. 2, 6, 7, and 9. The two side support plates 28 include rollers 30 supported by collapsible extension rails 32. The drawout unit 26 is shown in FIG. 1 in the fully rolled out position. The travel of the drawout unit 26 on the extension rails 32 is limited by contact of the forward rollers 30 with stop pins 34 on each rail 32. In this position the drawout unit 26 is completely disconnected from any source of high potential. A removable steel safety barrier 38 covers the upper part of the drawout unit 26 between the side plates 28. The barrier 38 is fastened to the drawout unit 26 by quarter-turn fasteners 90. A gasket 44 is mounted on the interior surface of the door 14 to form a water-tight seal against the edge of the enclosure 12 when the door is closed and fastened. The gasket 44 is more completely described in the aforementioned U.S. Pat. No. 3,923,197, entitled Gasket Assembly For Enclosed Electrical Apparatus, issued to Edmund W. Kuhn and assigned to the assignee of the present invention.

Referring now to FIG. 2, the drawout unit 26 includes three modules 48, 50 and 52. The construction of the modules 48, 50, and 52 is more completely described in the aforementioned U.S. patent application Ser. No. 564,573, entitled "Draw-Out Type Circuit Interrupter With Modular Construction". Thus only a brief description of the modules will be given here. The module 48 is the interrupter module and includes all of the drawout unit components which are at high potential. All load current through the drawout unit 26 flows through the interrupter module 48. The module 50 is the mechanism module and contains a motor-charged spring-driven mechanism 212 which serves to operate the current-carrying components of the interrupter module 48. The control module 52 contains components responsive to both manual operation and to network electrical conditions to command the mechanism module 50 to perform the proper opening or closing operations upon the interrupter module 48.

Figure 4:
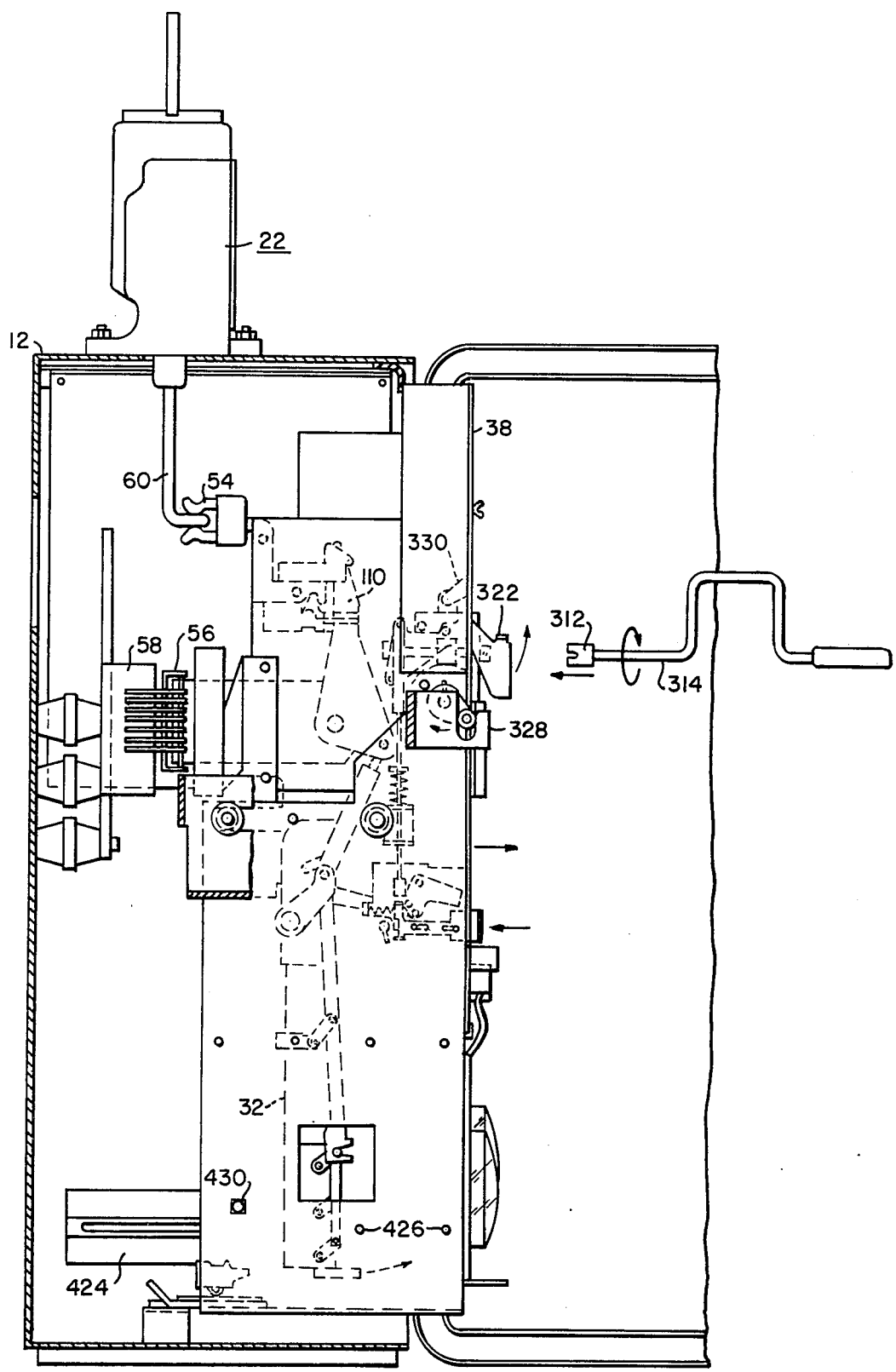
FIG. 4 is a side sectional view of the network protector of FIG. 1, with the drawout unit shown in a fully connected position.

The interrupter module 48 includes load disconnect structures 54 and line disconnect structures 56 connected to separable contacts 110 movable between an open position (FIG. 5) and a closed position (FIG. 4). When the drawout unit 26 is rolled into the enclosure 12 and levered into a completely connected position, the line disconnect structures 56 engage line terminals 58 mounted in the enclosure 12 which are electrically connected to the secondary windings of the network transformer, while the load disconnect structures 54 engage load terminals 60 mounted at the interior top of the enclosure 12 and connected to the secondary network from which customer services are fed. The separable contacts 110 are thus bridged across the terminals 58 and 60.

Figure 3:
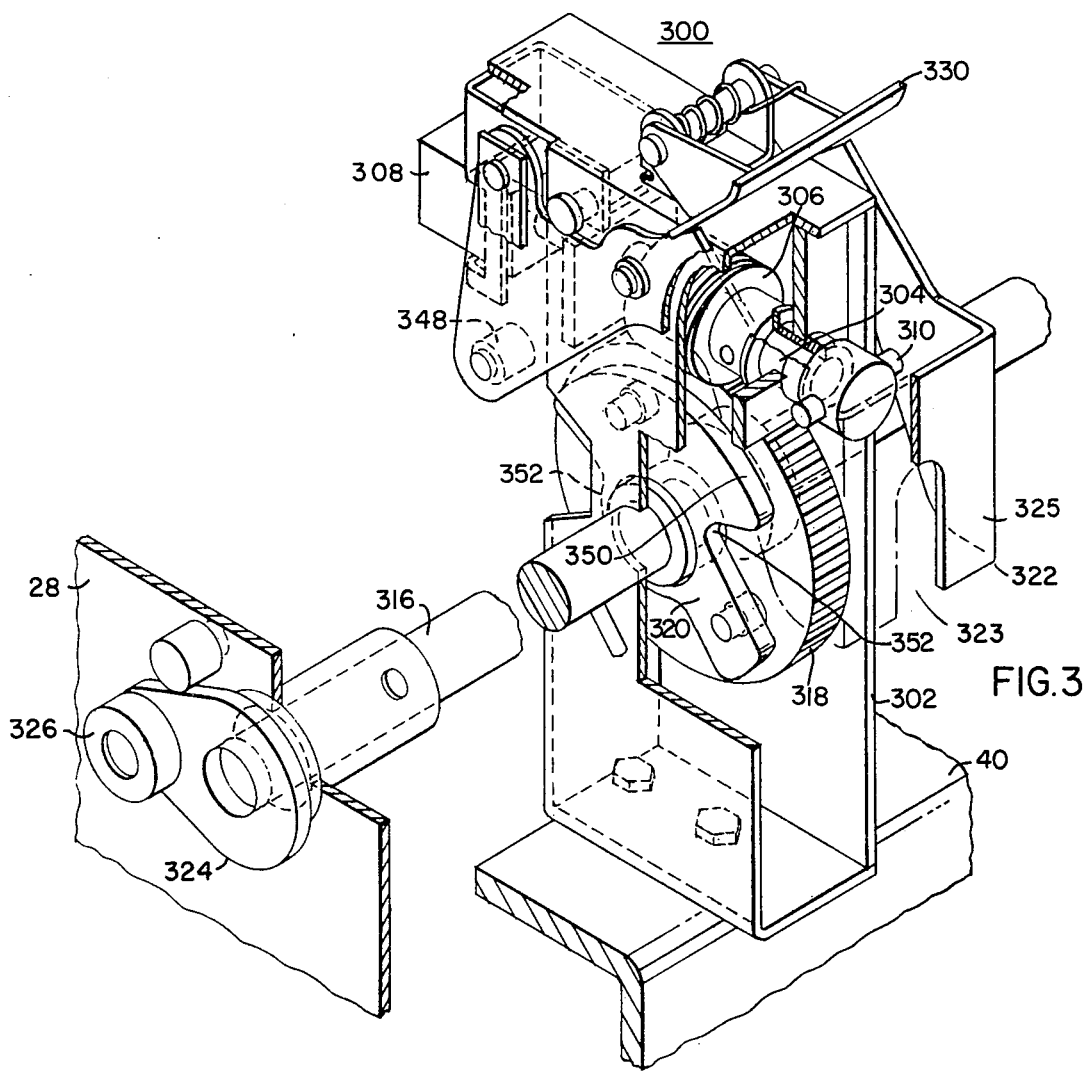
FIG. 3 is a perspective view of the levering mechanism shown in FIG. 2.

A levering mechansim 300, shown more clearly in FIG. 3, is employed to operate the drawout unit 26 between connected and disconnected positions. The levering mechanism 300 comprises a steel bracket 302 welded to the channel member 40 of the main support frame 27. A drive shaft 304 including worm gear 306 extends through the mounting bracket 302 in a direction perpendicular to the channel member 40. One end of the drive shaft 304 is threaded into a tapped hole in a square traveling stop nut 308 which is located by a square aperture in the rear of the bracket 302. The end of the drive shaft 304 opposite the threaded end includes a pin 310 which can be engaged by a cooperating socket 312 at the end of the operating crank 314 (FIG. 4). A levering shaft 316 extends through both side support plates 28 and through the mounting bracket 302 in a direction perpendicular to the drive shaft 304. Mounted upon the levering shaft 316 within the mounting bracket 302 is a main gear 318 which is engaged by the worm gear 306. Also, mounted upon the levering shaft 316 is an interlock cam 320 and which cooperates with a shutter 322 pivotally secured to the mounting bracket 302 to provide a safety interlock mechanism for the operating crank 314. The cam 320 includes surfaces 350 having large radii and surfaces 352 having small radii. The lefthand plate of the shutter 322 includes a cam pin 348 which cooperates with the interlock cam 320. At each end of the levering shaft 316 is an engaging lever 324 containing a roller 326. The levers 324 and rollers 326 cooperate with J-shaped hooks 328 mounted upon the enclosure 12. A spring-loaded pivot plate 330 is mounted at the top of the mounting bracket 302 and serves to prevent the raising of the shutter 322 unless lifted by the protective barrier 38, or otherwise displaced.

In order to operate the drawout unit 26 from the disengaged fully rolled out position as shown in FIG. 1 to the fully engaged position as shown in FIG. 4, the drawout unit 26 is manually rolled back along the rails 32 into the enclosure 12 until the rollers 326 contact the rear edge of the J-shaped hooks 328. In this position, shown in FIG. 5, the disconnect structures 54 and 56 are still physically separated from the terminals 58 and 60. The shutter 322 is then raised to allow insertion of the operating crank 314 and engagement of the drive shaft 304. The crank 314 can then be operated to cause counterclockwise rotation of the drive shaft 304. The attached worm gear 306 will also rotate in a counterclockwise direction to cause corresponding counterclockwise rotation of the levering shaft 316 and levers 324. The rollers 326 will move downward into the slot of the J-shaped hooks 328, pulling the drawout unit 26 into the enclosure 12.

Continued rotation of the operating crank 314 will cause continued rotation of the levers 324, pulling the drawout unit 26 into a completely connected position within the enclosure 12. In this position, as shown in FIG. 4, the disconnect structures 54 and 56 engage the terminals 58 and 60. As the crank 314 is rotated, the traveling nut 308 is constrained by the square aperture in the mounting bracket 302 and is drawn inward along the threaded end of the drive shaft 304. When the drawout unit 26 reaches the fully connected position, the threaded end of the drive shaft 304 contacts the bottom of the traveling nut 308, effectively preventing further rotation of the crank 314 and drive shaft 304.

The construction and operation of the crank interlock mechanism 334 are shown more clearly in FIGS. 6, 7, 8 and 9. A spring load trip plate 266 including an upwardly extending stop arm 346 is slidingly supported upon the mechanism module 50 and extends through an aperture in the barrier 38. Manual displacement of the trip plate 266 in the direction shown by arrow A of FIG. 6 will cause the trip plate to engage a pin 336, rotating a trip shaft 264. This will cause the mechanism 212 to rapidly open the separable contacts 110 of the interrupter module 48. The tripping action of the mechanism 212 is more completely described in the aforementioned U.S. patent application Ser. No. 564,573, entitled "Draw-Out Type Circuit Interrupter With Modular Construction".

The shutter 322 is pivotally supported upon the mounting bracket 302 at the point 338 and includes a vertical open-ended slot 323 which cooperates with the shaft of the operating crank 314 in a manner to be hereinafter described. Pivotally connected to the shutter 322 at the point 340 is a spring loaded reciprocating pushrod, or interlock link, 342 which terminates in an enlarged cylindrical shaped member 344.

The indicator flag 272 is pivotally mounted upon the mechanism module 50 at the point 273. A drive link 354 is pivotally connected to the indicator flag 272 at the point 356. The other end of the drive link 354 is connected to the operating mechanism 212, and serves to operate the indicator flag 272 to show the position of the separable contacts of the interrupter module 48. The indicator flag 272 also includes a blocking pin 358. When the separable contacts 110 of the interrupter module 48 are in the closed position, the drive link 354 and indicator flag 272 are in the position shown in FIG. 6. Thus, a CLOSE legend enscribed on a plate 360 is visible through the aperture 362 to an observer in front of the network protector 10. When the network protector 10 is tripped causing the contacts 110 of the interrupter module 48 to open, the drive link 354 pushes the indicator flag 272 to the position shown in FIG. 7. In this position, an OPEN legend enscribed on the front of the indicator flag 272 is visible through the aperture 362 and covers the CLOSE legend.

Figure 6:
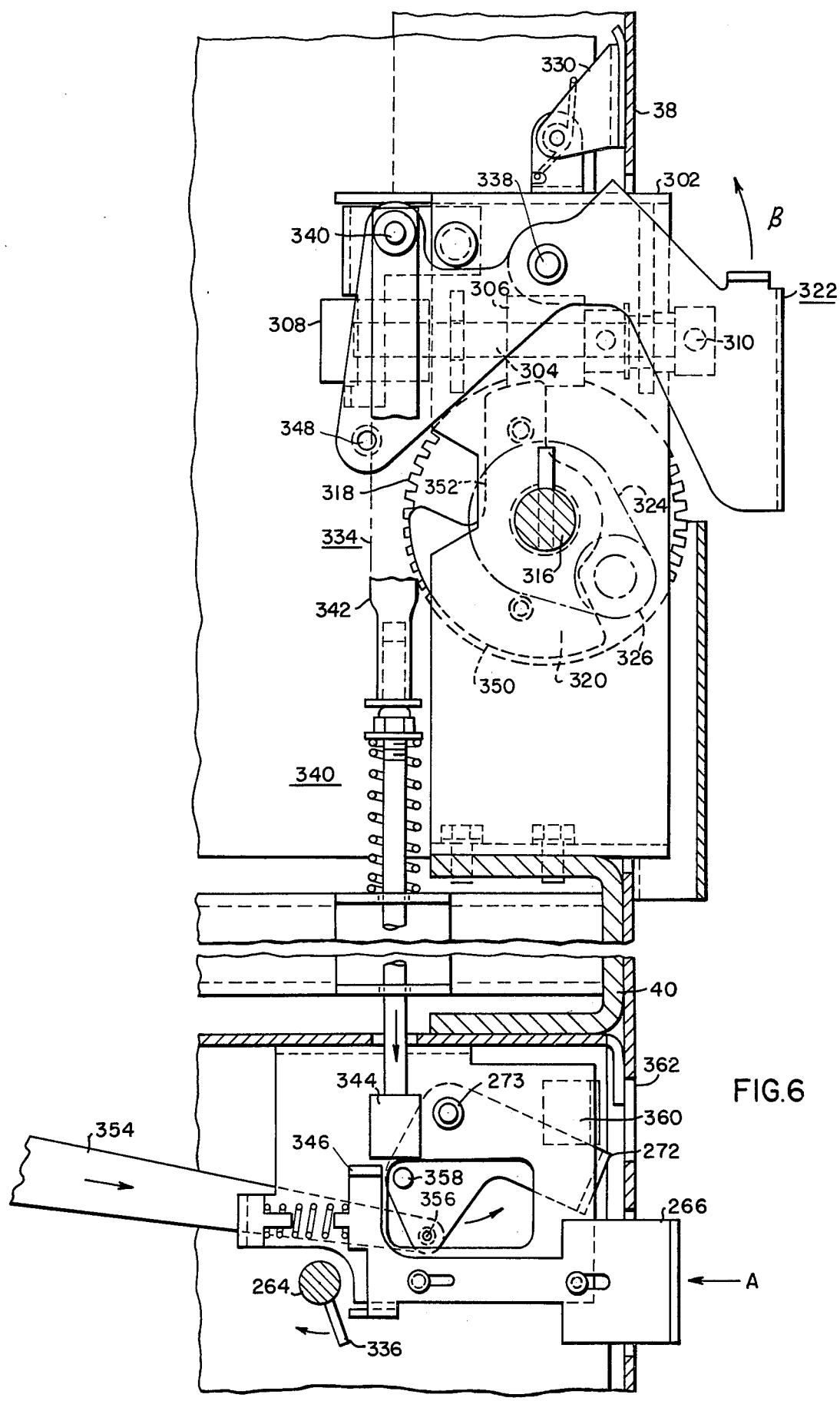
FIG. 6 is a detail side sectional view of the crank interlock and trip plate mechanisms shown in FIG. 4.

When the drawout unit 26 is in the completely engaged position, the components of the interlock mechanism 334 are in the positions shown in FIG. 6. As can be seen therein, the stop arm 346 of the trip plate 266 is in a position blocking downward movement of the interlock link 342. Thus, the shutter 322 is prevented from being raised. Since the shutter 322 covers the crank pin 310 of the drive shaft 304 (FIG. 3), the operating crank 314 is prevented from engaging the crank pin 310. If, however, the trip plate 266 is displaced in the direction shown by the arrow A in FIG. 6 and the shutter 322 is pivotally raised about the point 338 in the direction shown by arrow B, the interlock link 342 will move downward into the position shown in dashed lines in FIG. 7. Note that the cam pin 348 has a free path of movement into proximity with the small-radius surface 352 of the interlock cam 320. The operating crank 314 can then be inserted so that the crank socket 312 engages the crank pin 310 of drive shaft 304, as shown in FIG. 7.

When the shutter 322 is released, the spring loading action of the interlock link 342 pivots the shutter 322 clockwise about the point 338 until the upper edge of the slot 323 contacts the shaft of the operating crank 314, preventing the shutter 322 from returning to the fully lowered position. The trip plate 266 is thus trapped by interaction of the stop arm 346 and member 344 in a depressed position maintaining the rotation of the trip shaft 264 as shown in FIG. 7, thereby maintaining the network protector 10 in a trip free condition as described more fully in the aforementioned U.S. patent application Ser. No. 564,573, entitled "Draw-Out Type Circuit Interrupter With Modular Construction". The positions of the components of interlock mechanism 334 under these conditions are shown in solid lines in FIG. 7.

Figure 7:
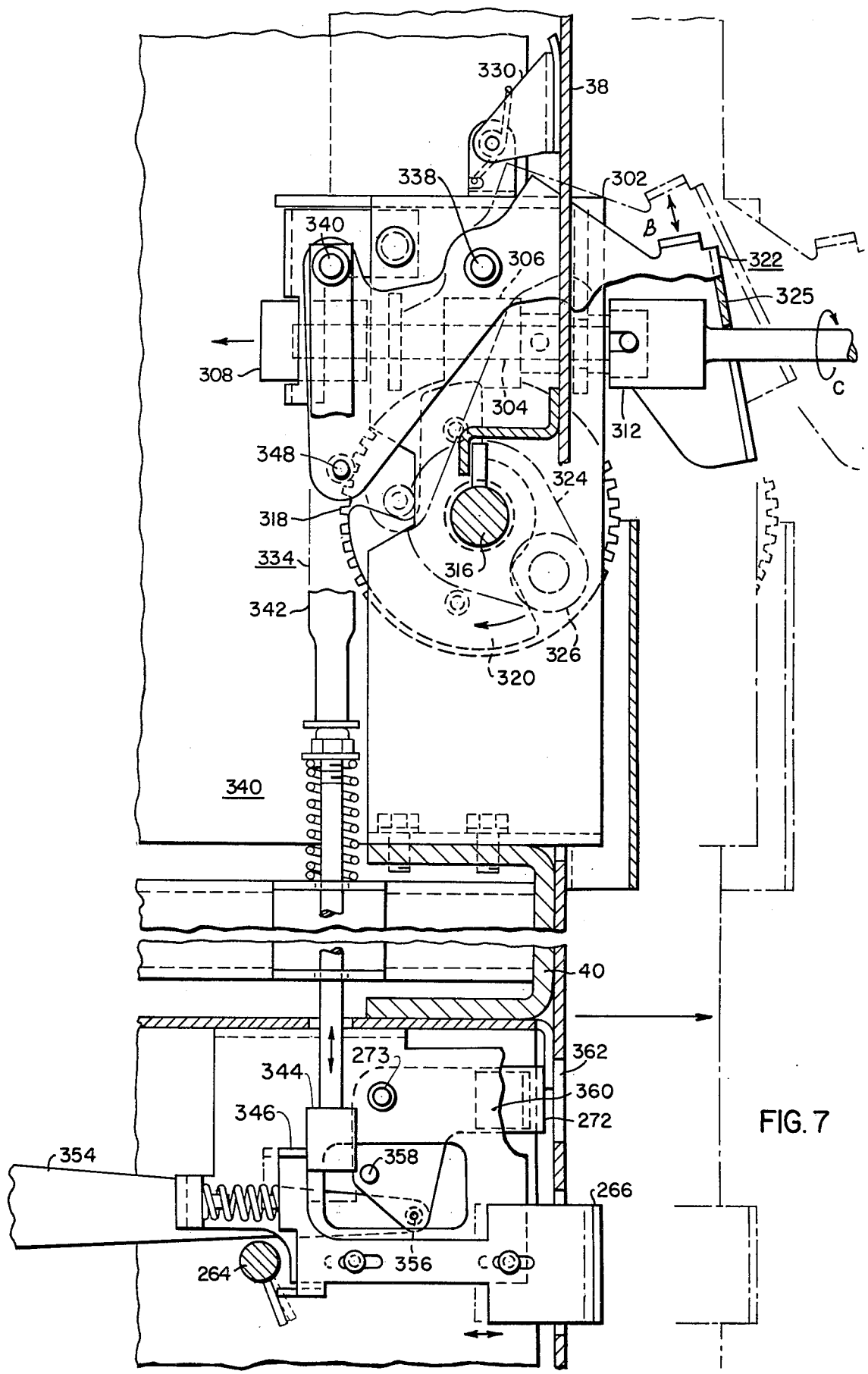
FIG. 7 is a view similar to FIG. 6 with a levering crank inserted in the levering mechanism.

Rotation of the operating crank 314 in a clockwise direction as shown in FIG. 3 (the direction shown by arrow C of FIG. 7) will cause the levering mechanism 300 to rotate the levering shaft 316, the engaging levers 324, and the interlock cam 320 in the directions shown in FIGS. 3 and 7.

Figure 8:
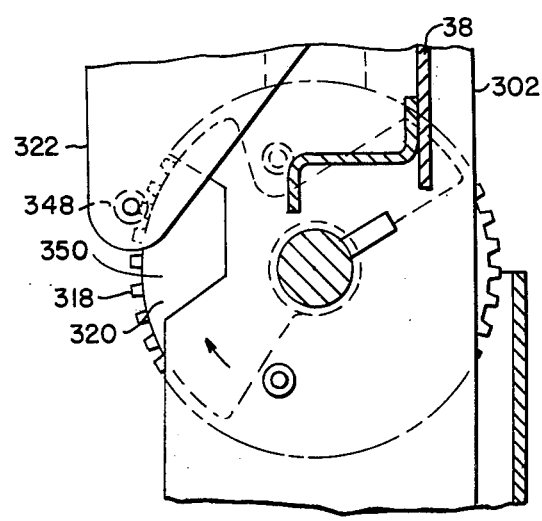
FIG. 8 is a detail sectional view of the crank interlock mechanism shown in FIG. 6, with the levering mechanism and drawout unit shown in a position intermediate the completely engaged and completely disengaged position.

Continued rotation of the operating crank 314 will move the drawout unit 26 from the completely connected position towards the completely disconnected position. While in a position intermediate the connected and disconnected positions, the interlock cam 320 is positioned as shown in FIG. 8. The large-radius surface 350 of the interlock cam 320 is now in the path of movement of the cam pin 348, thereby blocking it. This effectively prevents the shutter 322 from being raised. Attempted removal of the operating crank 314 will cause the crank socket 312 to bear against inner surface the front plate 325 of the shutter 322. Thus, the operating crank 314 is trapped and its removal is prevented while the drawout unit 26 is in a position intermediate the connected and disconnected positions.

Figure 5:
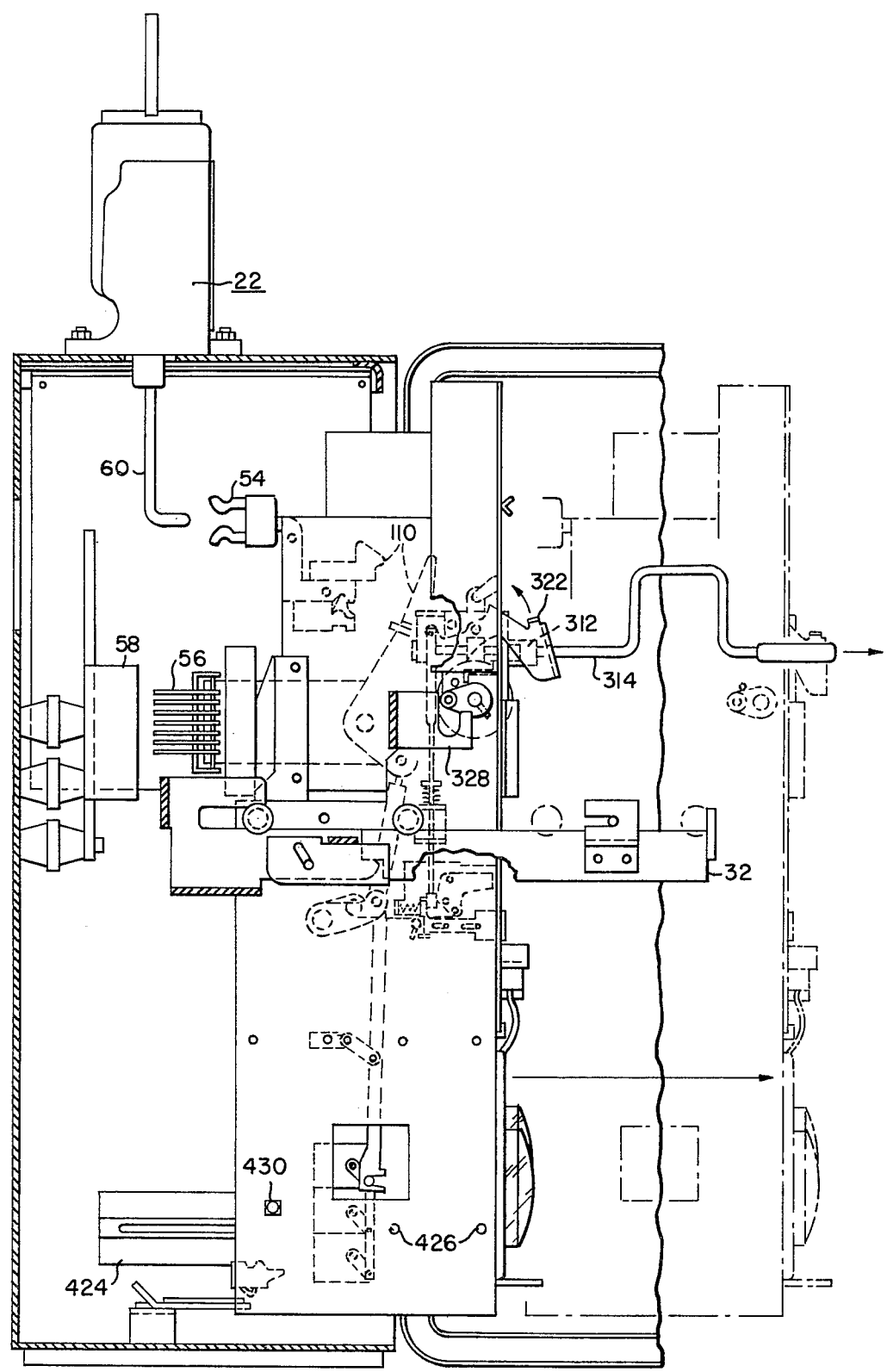
FIG. 5 is a view similar to FIG. 4 with the drawout unit shown in a fully disconnected position.
Figure 9:
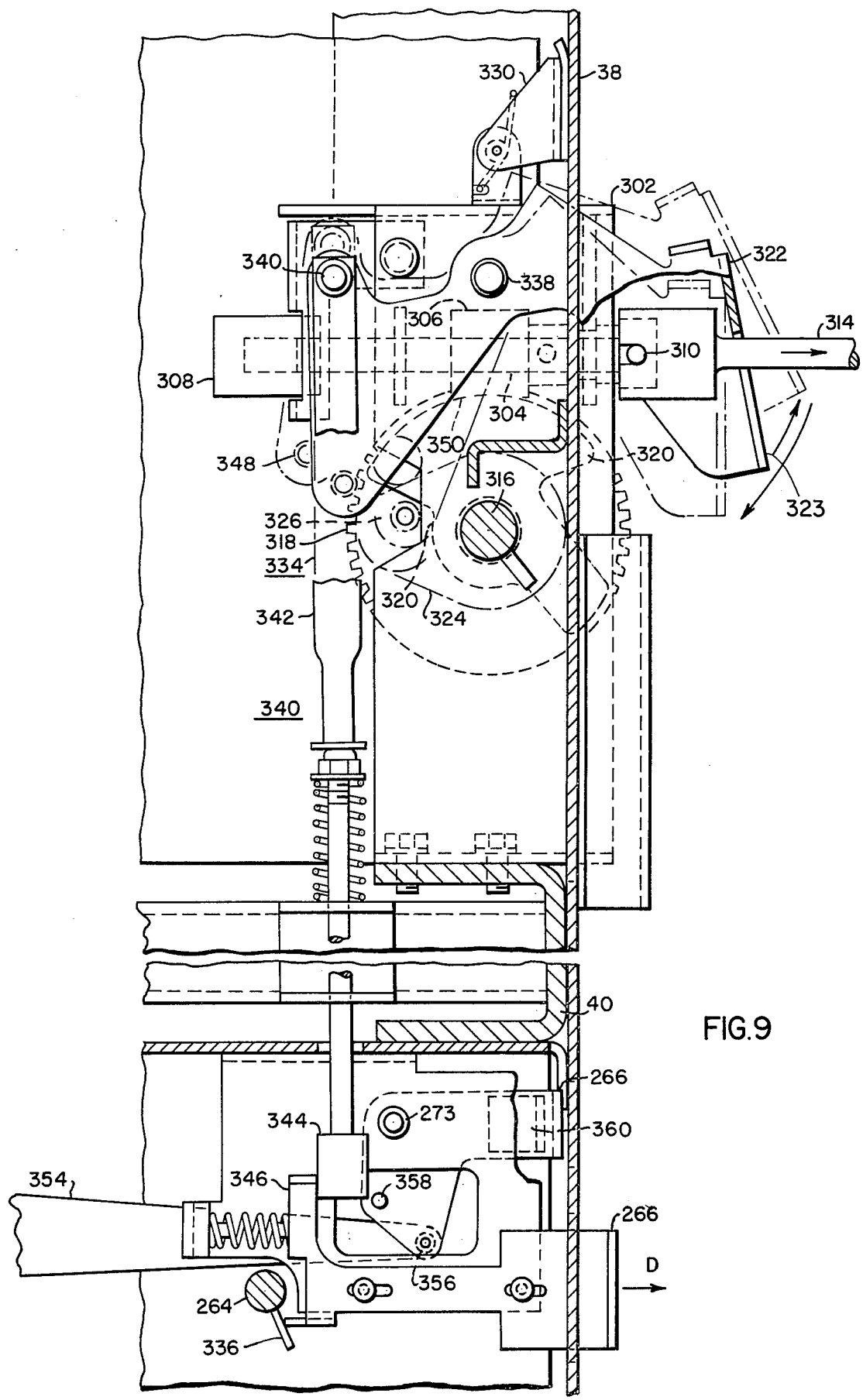
FIG. 9 is a view similar to FIG. 7 with the drawout unit shown in a completely disengaged position.

Continued rotation of the operating crank 314 will move the drawout unit 26 into the completely disconnected position as shown in FIG. 5. The position of the components of the interlock mechanism 334 is as shown in FIG. 9. The interlock cam 320 has now rotated such that the large-radius surface 350 is out of the path of movement of the cam pin 348, thereby allowing the shutter 322 to be raised and the operating crank 314 to be removed. Removal of the crank 314 allows the shutter to return to its lowest position as shown in the lower dashed lines in FIG. 9, thereby allowing the pushrod 342 to raise and release the trip plate 266. The spring loading action of the trip plate 266 will move it in the direction shown by arrow D of FIG. 9.

Operation of the drawout unit 26 from a disconnected position to a connected position is accomplished in a similar manner by inserting the operation crank 314 and rotating it in a clockwise direction as seen in FIG. 3. Again, the large radius surface 352 of the interlock cam 320 will be interposed into the path of movement of the cam pin 348 at all positions of the drawout unit between the disconnected and connected positions. Thus the shutter 322 is constrained in a lowered position, thereby trapping the operating crank 314 as previously described.

Note that the blocking pin 358 also prevents downward motion of the push rod 342 when the indicator flag is in the closed position (FIG. 6). This prevents the shutter 322 from being raised thereby preventing insertion of the operating crank 314 and operation of the levering mechanism 300 to move the drawout unit 26 while the contacts of the interrupter module 48 are closed. The blocking pin 358 moves to the position shown in FIG. 7 when the contacts of the interrupter module 52 are opened, thereby allowing movement of the pushrod 342.

With the operating crank 314 trapped in the interlock mechanism 334, the network protector 10 is held by a trip free condition with the interrupter module contacts in an open position. If the contacts 110 are welded together and do not open in response to a tripping operation the drive link 354 and indicator flag 272 will remain in the position shown in FIG. 6. Interlock action is thus provided even though the trip plate 266 is depressed, since downward motion of the pushrod 342 is prevented by the blocking pin 358 thereby locking the shutter 322 in a lowered position. Thus, it is not possible to allow current flow through the network protector 10 while the drawout unit is in a partially connected position. The possibilities of arcing and overheating are thus eliminated. In addition, it is not possible to close the enclosure door 14 while the operating crank 314 is trapped, thus eliminating the possibility of damage to the drawout unit 26 by closing the door 14 upon it while the drawout unit 26 is not completely levered into a connected position. By allowing the operating crank 314 to be removed only after the completion of a levering in or levering out operation, the invention provides a positive position indicating means. Thus, maintenance operations can be performed upon the network protector with confidence that it is in the desired position. It can be seen therefore that the invention provides a drawout type circuit interrupter with improved safety, reliability, and ease of maintenance.

We claim:

1. A drawout type circuit interrupter, comprising:
   an enclosure;
   a circuit interrupter unit mounted within said enclosure and movable between connected and disconnected positions;
   drawout means for moving said circuit interrupter unit between connected and disconnected positions;
   means removably attached to said drawout means for operating said drawout means; and
   interlock means permitting insertion and removal of said operating means when said circuit interrupter unit is in either a connected or a disconnected position, said interlock means preventing insertion and removal of said operating means when said circuit interrupter unit is in any position intermediate a connected and disconnected position, said interlock means comprising a shutter pivotally attached to said drawout means and movable between raised and lowered positions, said shutter comprising means for engaging said operating means to prevent insertion or removal of said operating means when said shutter is in a lowered position.

2. A drawout type circuit interrupter as recited in claim 1 wherein said interlock means further comprises means for locking said shutter in a lowered position when said circuit interrupter unit is in any position intermediate a connected and a disconnected position.

3. A drawout type circuit interrupter as recited in claim 2 wherein said drawout means comprises a levering shaft, a drive shaft, and gear means attached to said levering shaft and said drive shaft, rotation of said drive shaft by said operating means causing rotation of said levering shaft to operate said circuit interrupter unit between connected and disconnected positions.

4. A drawout type circuit interrupter as recited in claim 3 wherein said interlock means comprises a cam mounted upon said levering shaft, said cam being rotatable with said levering shaft and comprising a first surface and a second surface, said first surface being at a greater distance from said levering shaft than said second surface, and
   said shutter comprises a cam pin cooperating with said cam and defining a path of movement when said shutter is pivoted between lowered and raised positions, said cam interposing said first surface within said cam pin path of movement when said circuit interrupter unit is in any position intermediate a connected and a disconnected position.

5. A drawout type circuit interrupter as recited in claim 1 wherein said circuit interrupter unit comprises separable contacts operable between open and closed positions, trip means for operating said separable contacts from a closed to an opened position, and means connected to said interlock means for preventing insertion of said removable operating means until actuation of said trip means.

6. A drawout type circuit interrupter as recited in claim 5 wherein said trip means comprises a trip plate, displacement of said trip plate being operable to actuate said trip means and open said separable contacts, and said prevention means comprises a pushrod having one end connected to said shutter and the other end cooperating with said trip plate, said pushrod preventing said shutter from being operated from a lowered to a raised position until said trip plate is displaced a distance sufficient to operate said trip means.

7. A drawout type circuit interrupter as recited in claim 6 wherein said pushrod traps said trip plate to hold said trip means in a trip free condition when said circuit interrupter unit is in a position intermediate a connected and disconnected position.

8. A drawout type circuit interrupter as recited in claim 1 wherein said circuit interrupter unit comprises separable contacts operable between open and closed positions, and said circuit interrupter comprises means connected to said separable contacts and cooperating with said interlock means to prevent insertion of said operating means when said contacts are in a closed position.

* * * * *